Figure 1:
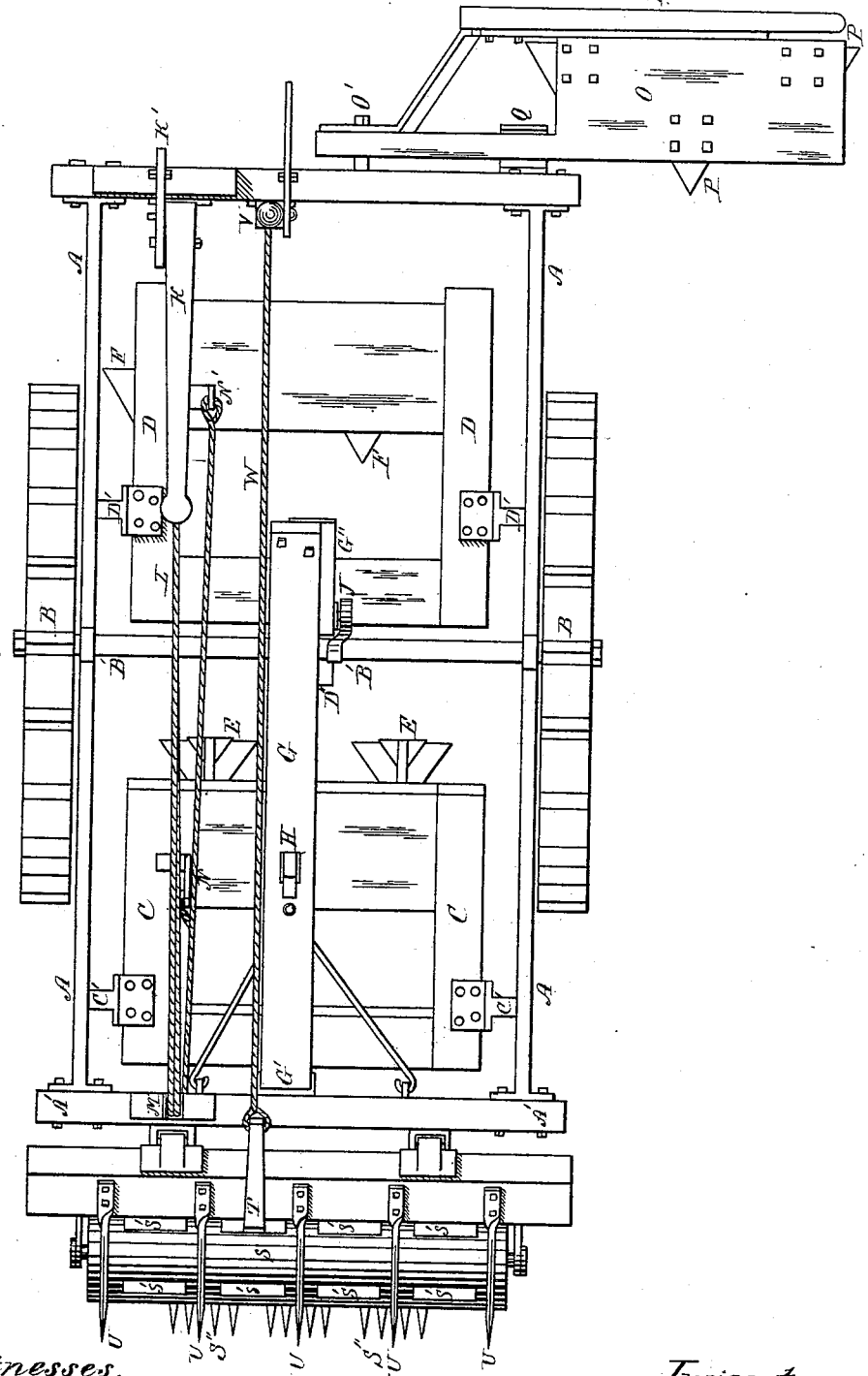

(No Model.)  3 Sheets—Sheet 1.

L. STEBBINS.
CULTIVATING MACHINE.

No. 269,339. Patented Dec. 19, 1882.

Witnesses.
Edwin F. Dimock.
Wilmot Horton.

Inventor.
Lucius Stebbins
by Theo. G. Lees,
Attorney.

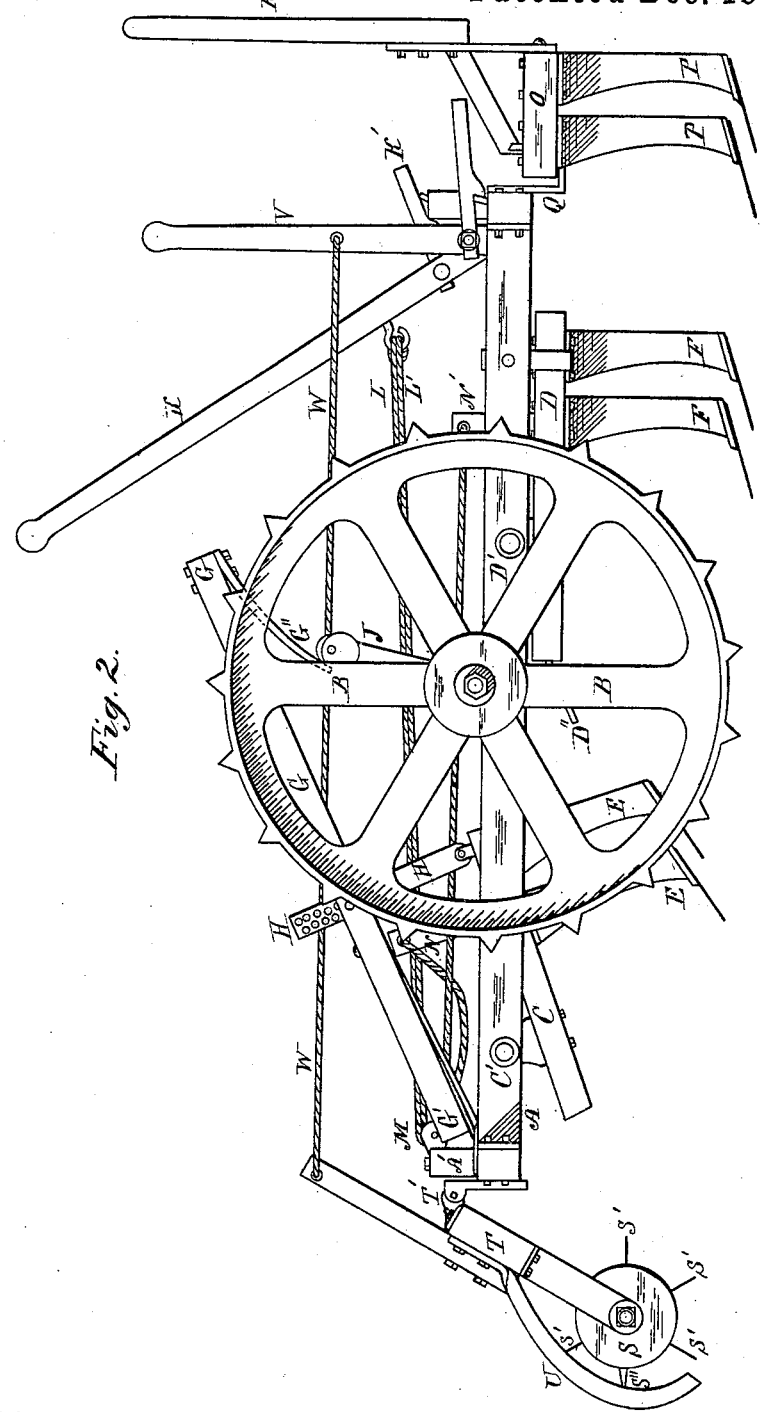

(No Model.) 3 Sheets—Sheet 3.
L. STEBBINS.
CULTIVATING MACHINE.
No. 269,339. Patented Dec. 19, 1882.
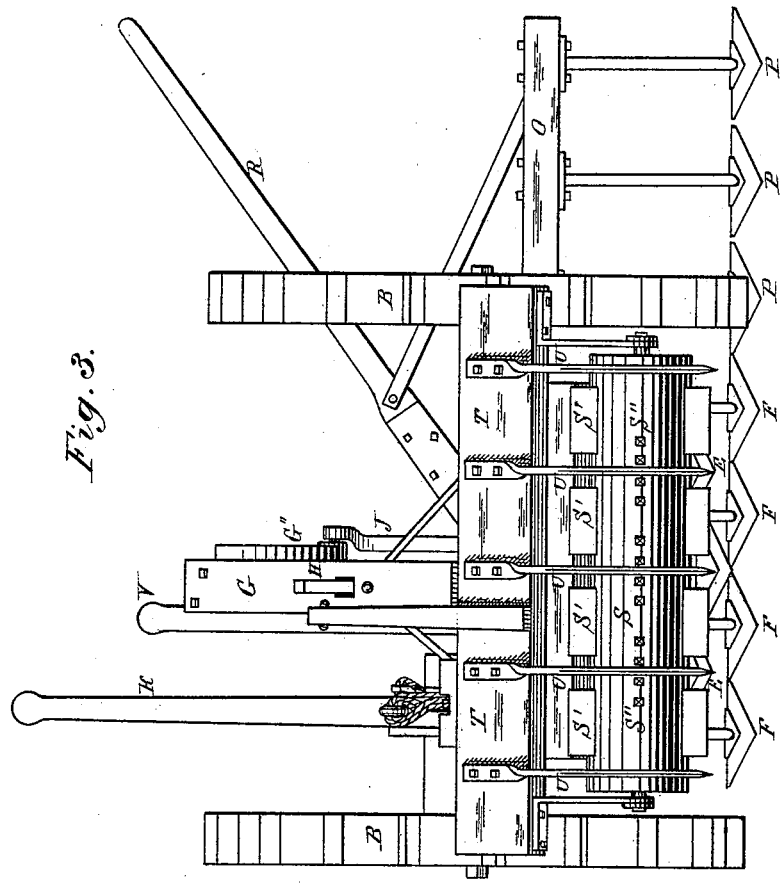
Witnesses.
Edwin F. Dimock.
Wilmot Horton.
Inventor.
Lucius Stebbins
by Theo. G. Ellis,
Attorney.

UNITED STATES PATENT OFFICE.

LUCIUS STEBBINS, OF HARTFORD, CONNECTICUT.

CULTIVATING-MACHINE.

SPECIFICATION forming part of Letters Patent No. 269,339, dated December 19, 1882.

Application filed September 21, 1882. (No model.)

*To all whom it may concern:*

Be it known that I, LUCIUS STEBBINS, of Hartford, in the county of Hartford and State of Connecticut, have invented certain new and useful Improvements in Cultivating-Machines; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to machines intended to be used for the purpose of digging and loosening up the ground and for destroying weeds. It is designed to be drawn by horse or other animal power, and to be guided and operated by hand.

The object of my invention is to provide a machine which will accomplish the purposes above stated in a more complete and effectual manner, especially where the weeds are heavy and thick, than has heretofore been done.

In the accompanying drawings, on three sheets, illustrating my invention, Figure 1 is a top view of my improved cultivating-machine. Fig. 2 is a side view of the same. Fig. 3 is a front view of the same. The parts are all shown in the same position in the different views.

A is the frame of the machine.

B B are wheels upon which the machine rolls upon the ground. They are connected by the shaft B', which turns in bearings in the frame A.

C and D are rocking frames, hinged to the frame A at C' and D'. These frames carry the cultivating teeth or blades E and F, which are arranged across the width of the machine in rows so as to act upon all points of the surface. The rear ends of the frames C and D are raised alternately as the machine progresses, to prevent them from becoming clogged by weeds, and can also be raised any time at will to free them from the ground.

G is a bar hinged to the frame A at G'. It is connected with the rocking frame C by the adjustable link H, which is furnished with a series of holes and a pin for regulating the height to which the rear end of the frame is lifted.

J is a revolving cam, fixed upon the axle B', which acts upon the plate G'' and raises the rear end of the bar G at each revolution of the wheels B. The rear end of the rocking frame D is also raised at each revolution of the wheels by the cam J striking upon the plate D'', which depresses the forward end of the frame and lifts the rear end, upon which the teeth F are placed. The frames C and D are raised alternately in such a manner that as the machine is drawn forward the place left untouched by the forward teeth, E, is operated upon by the rear teeth, F. In this way every part of the ground is passed through by one or the other set of teeth.

K is a lever for raising both of the frames C and D when desired. It is pivoted at its lower end to the frame A.

L and L' are wire ropes or other cords, passing from the lever K over the pulley M to the studs N and N' on the frames C and D. When the lever K is drawn back both the frames are lifted so that the teeth E and F are free from the ground. This can be done at any time to free the teeth from weeds if they become clogged, and is required to be done when the machine is turned round.

K' is a latch for holding the lever K back when required.

O is a third rocking frame, carrying the teeth P. It is hinged to the frame A at O', and, when down in the position shown in the drawings, rests in a hook-bearing, Q, by which it is held firmly against the pressure of the working-teeth. This frame is furnished with a handle, R, by which it is turned up to bring the teeth out of the ground when desired. It can also be turned up vertically when required, so as to be out of the way. This attachment is intended to be used for cultivating between trees, and is let down so as to operate in the space between each two, and is raised in passing the trunks of the trees.

S is a roller at the forward end of the machine, furnished with cutting-blades S' for cutting the surface laterally as the machine moves forward.

T is a frame for supporting the rollers S. It is hinged to the frame A at T', and carries the axle of the roller at its lower end.

U U, &c., are a series of cutters, attached to the frame T and lying between the blades S', for the purpose of cutting the surface of the ground longitudinally as the machine moves forward. In the drawings a variation in the form of the cutters S' is shown at S'', where they are made in the form of teeth. In this case the cutters U are placed at about the same intervals as with the blades, leaving several teeth between them.

V is a lever for lifting and operating the roller S. It is hinged at its lower end to the frame A. It has the wire rope or cord W leading from it to the upper end of the hinged frame T, so that when the lever is drawn back the roller is raised. When the machine is in operation the frame T stands in a vertical position and lies against the forward end of the frame A. When it is desired to lift the roller the lever is drawn back, as shown in the drawings, which throws the roller S forward and upward, so that it is out of the ground. The roller is required to be raised when the machine is turned round.

My improved cultivating-machine is intended to be drawn by one or more animals, according to its size. The shafts or pole is attached to the forward bar, A', of the frame in any customary manner. My improved machine is particularly adapted to the cultivating and weeding of orange groves and orchards, and its operation is as follows: The machine is drawn forward, as before described, by animal-power, and is followed by the operator, who walks in the rear, so as to be near the levers K, V, and R. The wheels hold to the ground by their rims, and alternately raise the teeth E and F, as has been described. At each tree the operator turns back the frame O by means of the handle R and lets it down when the tree is passed. Whenever required the teeth E and F are raised by the lever K, and at the end of the line the machine is turned by drawing back the levers K and V and turning over the handle R, so as to lift all the parts of the machine except the wheels B from the ground. The machine is then turned, the parts raised again let down, and another line commenced.

What I claim as my invention is—

1. In a cultivating-machine, the combination of the rocking frame C, the bar G, the adjustable link H, and the cam J on the axle of the wheels B, substantially as described.

2. In a cultivating-machine, the combination of the two rocking frames C and D, with the wheels B and intermediate mechanism, whereby said frames are operated alternately, substantially as described.

3. In a cultivating-machine, the combination of the hinged frame T, the roller S, having blades S', the cutters U, the cord W, and the lever V, substantially as described.

4. The pivoted frame O, provided with teeth P and handle R, in combination with the frame A, provided with the hook Q, and adapted to turn upward, substantially as described.

LUCIUS STEBBINS.

Witnesses:
   THEO. G. ELLIS,
   EDWIN F. DIMOCK.